Dec. 31, 1929.　　　G. A. BROOKS　　　1,741,610
AUTOMOBILE TAG
Filed March 5, 1929　　2 Sheets-Sheet 1

INVENTOR
Gus A. Brooks,
BY C. W. Miles.
ATTORNEY

Dec. 31, 1929.   G. A. BROOKS   1,741,610
AUTOMOBILE TAG
Filed March 5, 1929   2 Sheets-Sheet 2
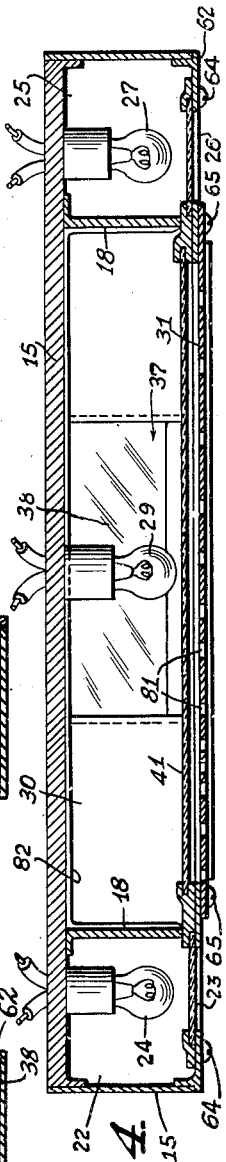
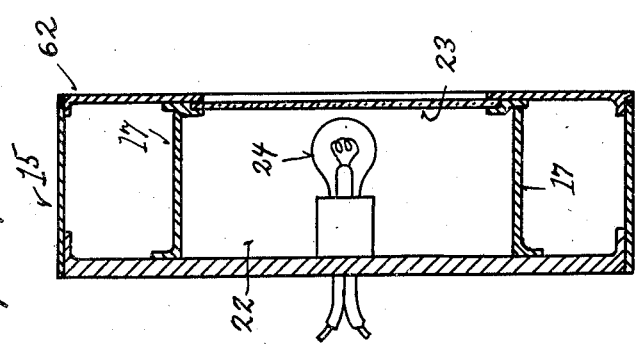
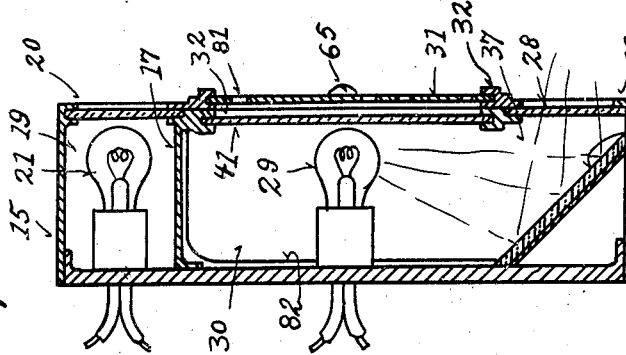
INVENTOR
Gus A. Brooks,
BY C. W. Miles.
ATTORNEY Patented Dec. 31, 1929

1,741,610

UNITED STATES PATENT OFFICE

GUS A. BROOKS, OF MAYS LICK, KENTUCKY

AUTOMOBILE TAG

Application filed March 5, 1929. Serial No. 344,477.

My invention relates to improvements in automobile tag and signal apparatus. One of its objects is to provide signal housing members adapted to serve permanently upon the front and rear of an automobile and arranged to act as the supports for annually replaceable automobile front and rear tags, which slip into and out of place and are replaceable as to color as well as date and State or locality, and are illuminated at night. Another object is to provide signal housing members in which the stop light, tag illuminating and tail light, and right and left turn signal lights are all permanently housed. Another object is to provide an improved combination of housing having an illuminated replaceable tag and a tail light. Another object is to provide an improved combination of tail light, replaceable illuminated tag and owner identification plate. Another object is to provide an improved housing and replaceable illuminated and changeable tag. Another object is to provide an improved housing and replaceable changeable and perforated tag.
My invention also comprises certain details of form and arrangement and combination of components, all of which will be fully set forth in the description of the accompanying drawings, in which:—
Fig. 1 is a plan of a housing adapted to support a rear tag, a tail light, a stop light and such other signal lights as may be desired.

Fig. 2 is a vertical section through the rear housing taken on line 3—3 of Fig. 1.
Fig. 3 is a vertical section through the rear housing taken on line 4—4 of Fig. 1.

Fig. 4 is a horizontal section through the rear housing.

Figure 1:
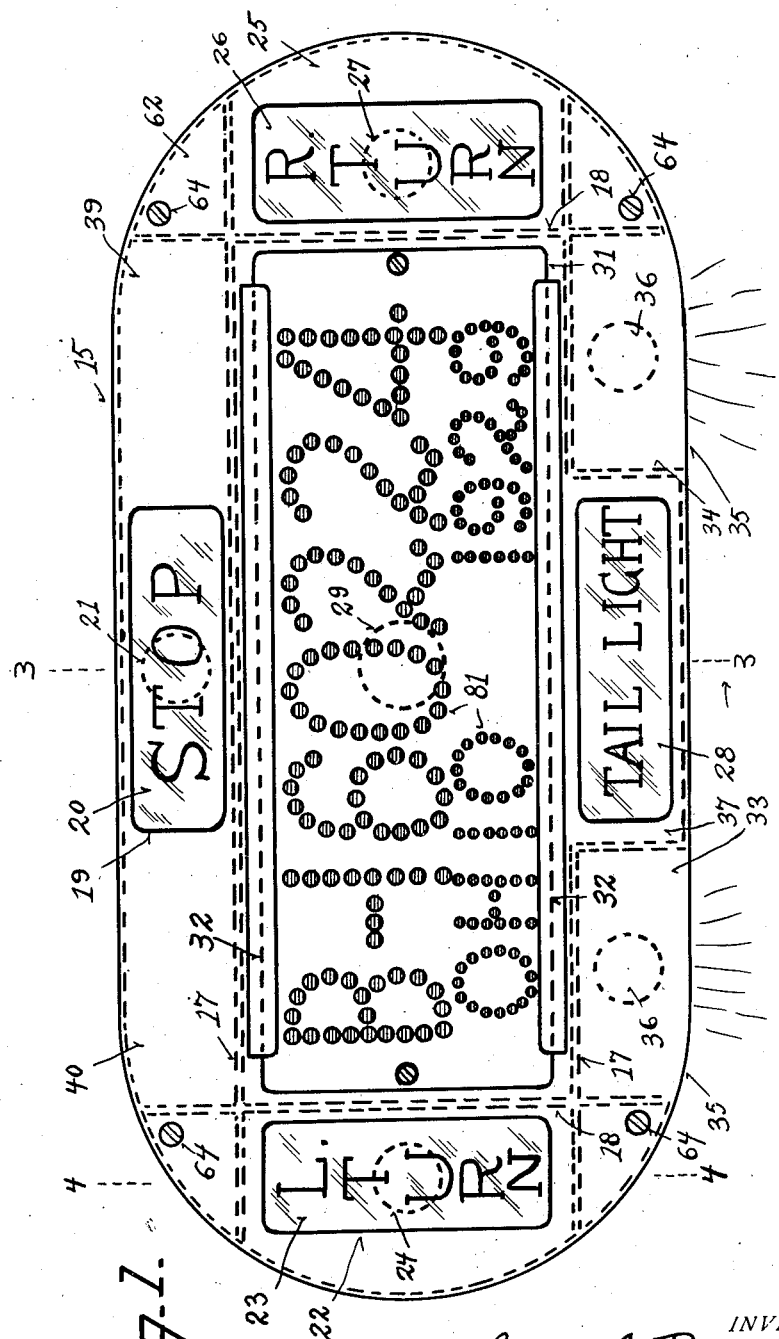

The accompanying drawings illustrate one embodiment of my invention, in which 15 represents a rear tag and signal housing attached to the center or one side of the rear of an automobile and 16 a front tag and signal housing attached preferably to the center of the front of the automobile. These housings are designed to be permanently attached to the automobile and may be constructed all of metal or partly of metal and partly of wood and other materials such, for instance, as insulating fibre and bakelite. Each housing is preferably divided by horizontal partition walls 17 and vertical partition walls 18 into a plurality of separate compartments. One compartment 19 is provided with a rearwardly directed window of colored glass or other light transmitting glazing material 20, adapted to serve as a stop light window. A signal light 21 is located within the compartment 19 in position to show rearwardly through the stop light window 20. A compartment 22 is provided with a rearward window of clear or colored glazing material 23. A light 24 located within the compartment 22 is designed to display rearwardly through the window 23 a signal indicating to those in rear of the automobile that a left hand turn of the automobile is about to be made. A compartment 25 provided with a rearwardly directed window of clear or colored glazing material 26 is provided with a light 27 adapted to display rearwardly through the window 26 a signal that the automobile is about to make a right hand turn. A rearwardly directed window 28 serves as a tail light signal, and preferably receives its light from a light 29 located in a relatively large central compartment 30 the rear of which is covered by a rear automobile tag 31, which is held in place by being slipped in a horizontal direction into place between the channeled upper and lower edges of a window 32 in the rear wall of the housing 15. As illustrated the tag 31 comprises a sheet of metal or fibre having its automobile number "B 160224, Ohio, 1929," formed by a series of closely arranged perforations through the tag sheet 31. These perforations being of a contrasting color as compared with the color of the face of the sheet 31, are readily legible in daylight, and after dark light rays from the light 29 shines through the perforations in the sheet 31, and renders the license tag readily legible at a distance from the rear. The two compartments 33 and 34 are each provided with a downwardly directed window 35 and a light 36, adapted to throw light rays upon the road in rear of the automobile to assist the operator in backing the automobile after dark. The central compartment 30 is preferably provided with a downward extension 37 provided with the window 28. A mirror 38 in the extension 37 catches a portion of the rays downwardly from the light 29 and reflects the rays rearwardly through the colored window 28. If desired a separate tail light may be provided in rear of the window 28. A space 39 upon the rear face of the housing 15 is designed to receive the signature of the State official authorized to issue licenses and also the signature of the owner of the automobile. A space 40 upon the rear face of the housing 15 is designed to receive a copy of the driver's license. Inside of the tag or sheet 31 and interposed between the sheet 31 and the light 29 is a colored sheet of glazing material 41 which causes the license number to show in colors at night, due to the light rays from light 29 passing through the colored sheet 41. The interior of compartment 30 is preferably lined with white light reflecting surface in order that the various digits of the license number may show equally bright.

In practice it is designed that the housings 15 and 16 are to be permanently attached to the automobile and used year after year, while the license tag 31 is to be changed from year to year, and if desired the sheet 41 may also be changed from year to year, whereby the color contrast between the color carried upon the face of the tag sheets and the perforations may be changed from year to year in the different States or territorial divisions. Also where the sheet 41 is changed from year to year, the color of the tag numerals is changed also from year to year.

The plate 62 of the housings 15 and 16 are preferably detachable and held in place by means of a series of screws 64. Upon detaching the plate 62, the various glazed members may be detached and replaced. The license tag 31 is preferably held in place by means of screws 65 to prevent said license plate working loose and becoming lost.

The license tags and signal apparatus are materially simplified and improved and the cost thereof reduced. Also a uniform type of structure may be employed and still distinguish both day and night the tags of the various territorial divisions. Also the numerals of the tags are not liable to be obscured by an accumulation of dust or mud upon the faces thereof, since the perforations are not liable to be closed under normal conditions, and thus serve to display the numbers etc. even though the imperforated portion of the tag face be coated with dust or mud.

The apparatus herein shown and described is capable of considerable modification within the scope of the claims without departing from the spirit of my invention.

What I claim is:—

1. A license tag comprising a housing, a central compartment, an upper longitudinal partition extending across said compartment and forming an upper boundary for said central compartment, a lower partition extending longitudinally across said compartment and forming a lower boundary for said central compartment, a window in said central compartment, a license tag mounted in said window and having cut out portions designating a number and name of a State, a source of illumination located behind said license plate, said lower partition having a cut out portion substantially in the center thereof, a lower compartment containing a window, a mirror mounted in said lower compartment and adapted to reflect rays of light coming through said cut out portion from said central compartment through the lower compartment window, a colored translucent material covering the window last mentioned and constituting a tail light, transverse partitions located on either side of said central compartments and forming side boundaries therefor and forming side compartments on either side thereof, signal means located in said compartments adapted to indicate intention to turn right or left, an upper compartment located above said central compartment, stop signal means located in said upper compartment and sources of illumination in said upper and side compartments.

2. A license tag comprising a housing, a central compartment, an upper longitudinal partition extending across said compartment, and forming an upper boundary for said central compartment, a lower partition extending longitudinally across said compartment and forming a lower boundary for said central compartment, a window in said central compartment, a license tag mounted in said window and having cut out portions designating a number and name of a State, a source of illumination located behind said license plate, said lower partition having a cut out portion substantially in the center thereof, a lower compartment containing a window, a mirror mounted in said lower compartment and adapted to reflect rays of light coming through said cut out portion from said central compartment through the lower compartment window, a colored translucent material covering the window last mentioned and constituting a tail light, transverse partitions located on either side of said central compartment and forming side boundaries therefor and forming side compartments on either side thereof, signal means located in said compartments, adapted to indicate intention to turn right or left, an upper compartment located above said central compartment, stop signal means located in said upper compartment, sources of illumination in said upper and side compartments, said mirror having means supporting the same at an angle to said tail light window and in the rear thereof.

In testimony whereof I have affixed my signature.

GUS A. BROOKS.